(12) United States Patent
Soufan

(10) Patent No.: US 8,699,235 B2
(45) Date of Patent: Apr. 15, 2014

(54) MOBILE PHONE/PDA SECURITY MASKING BOX

(75) Inventor: Ali H Soufan, Tenafly, NJ (US)

(73) Assignee: CDD Ventures LLC, New York, NY (US)

( * ) Notice: Subject to any disclaimer, the term of this patent is extended or adjusted under 35 U.S.C. 154(b) by 323 days.

(21) Appl. No.: 12/929,721

(22) Filed: Feb. 11, 2011

(65) Prior Publication Data

US 2011/0198245 A1    Aug. 18, 2011

Related U.S. Application Data

(60) Provisional application No. 61/338,184, filed on Feb. 17, 2010.

(51) Int. Cl.
*H05K 7/14* (2006.01)

(52) U.S. Cl.
USPC ............................ 361/800; 361/816; 361/818

(58) Field of Classification Search
USPC .......... 455/39, 67.11, 67.12, 130, 227, 226.1, 455/226.4; 361/732, 752, 800, 792, 799, 361/816, 188; 174/51
See application file for complete search history.

(56) References Cited

U.S. PATENT DOCUMENTS

| | | | | |
|---|---|---|---|---|
| 3,963,883 A * | 6/1976 | Kulka | ........................... | 379/453 |
| 3,990,075 A * | 11/1976 | Schmitz et al. | ............... | 340/502 |
| 4,494,651 A * | 1/1985 | Malcolm | ....................... | 206/719 |
| 4,829,729 A * | 5/1989 | Derner et al. | ................. | 52/171.3 |
| 5,586,168 A * | 12/1996 | Bucalo et al. | ............... | 455/575.1 |
| 8,203,850 B2 * | 6/2012 | Bouza et al. | ................... | 361/800 |
| 2003/0048910 A1 * | 3/2003 | Roy et al. | ..................... | 381/73.1 |
| 2004/0183547 A1 * | 9/2004 | Kildal | ........................... | 324/627 |
| 2009/0021654 A1 * | 1/2009 | Jones | ........................... | 348/838 |

* cited by examiner

*Primary Examiner* — Boris L. Chervinsky
*Assistant Examiner* — Pete Lee
(74) *Attorney, Agent, or Firm* — Handal & Morofsky LLC

(57) ABSTRACT

The Mobile Phone/PDA Security Masking Box is a sound insulated box for use as a temporary storage location for cellular and other mobile devices in locations at which confidential and sensitive conversations and discussions are being conducted. A pink/white noise generating device within the box generates a masking noise such that the cellular or other mobile devices inside the box are unable to pick up or record conversations outside the box.

20 Claims, 2 Drawing Sheets

MOBILE PHONE/PDA SECURITY MASKING BOX

BACKGROUND OF THE INVENTION

This invention relates, in general, to a box for the storage of cellular or mobile wireless devices, and, in particular, to a box which produces a white noise to prevent the cellular or mobile wireless devices from picking sounds from the surrounding area.

Senior executives and officials constantly strive to keep sensitive, confidential, intellectual property and trade secrets protected. During discussions of these products in offices and elsewhere, they are also required or need to be in communications contact with others. Today staying in contact is more than ever being done by cellular or mobile wireless devices. These individuals need to keep their devices connected to the network and be able to recognize and respond to certain calls and messages even when having sensitive and confidential discussions with others.

Today more devices are capable of multiple functions and also some devices are capable of being manipulated remotely into remote listening devices such that the phone's built in microphone can be activated and room sounds be picked up and transmitted to a remote location. Other devices such as pens, watches and other normal body worn items can be intentionally or unintentionally carried into an area of sensitive conversation and record or transmit audio.

SUMMARY OF THE INVENTION

The present invention is directed to a box which produces a white noise to prevent the cellular or mobile wireless devices within it from picking sounds from the surrounding area. The Mobile Phone/PDA Security Masking Box provides a countermeasure against the vulnerability of subjecting confidential and private conversations being picked and recording by cellular or mobile wireless devices, and yet allows for alerting of incoming calls and visual identification of caller ID to allow the conversation to be interrupted and the required phone call or message responded to. Several cellular or mobile wireless devices can be placed within the enclosure simultaneously as well as potentially vulnerable devices that have or may have electronics within such as watches, pens, recorders, thumb drives etc.

It is an object of the present invention to provide a new and improved security box cellular or mobile wireless devices that will prevent the devices from picking up or recording conversations outside of the box.

It is an object of the present invention to provide a new and improved security box cellular or mobile wireless devices which will allow the devices to receive incoming call while isolating them from local conversations.

It is an object of the present invention to provide a new and improved security box cellular or mobile wireless devices to be easily accessed should they require attention while isolated.

These and other objects and advantages of the present invention will be fully apparent from the following description, when taken in connection with the annexed drawings.

DESCRIPTION OF THE PREFERRED EMBODIMENT

The preferred embodiment herein described is not intended to be exhaustive or to limit the invention to the precise form disclosed. It is chosen and described to best explain the invention so that others, skilled in the art to which the invention pertains, might utilize its teachings.

Figure 1:
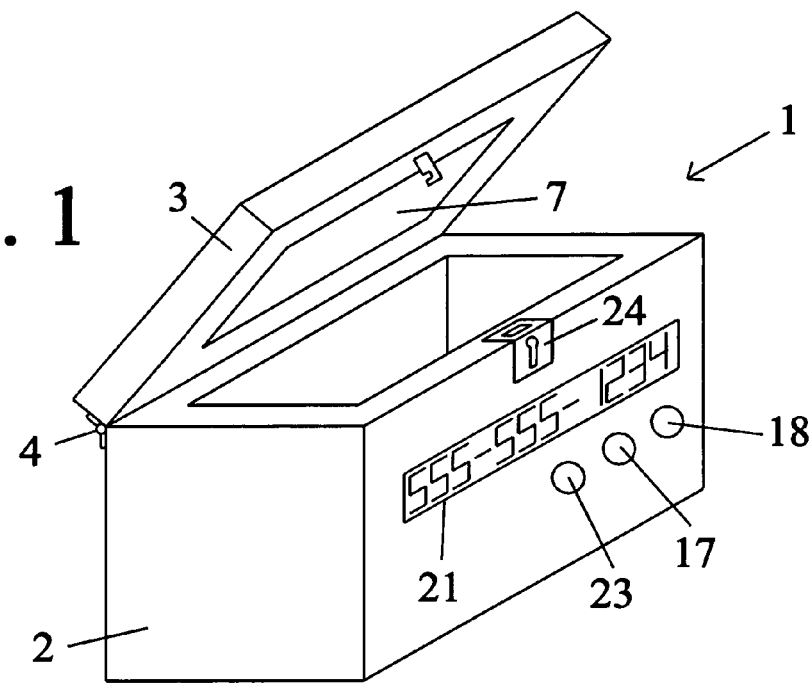
FIG. 1 is an overall view of the present invention.
Figure 2:
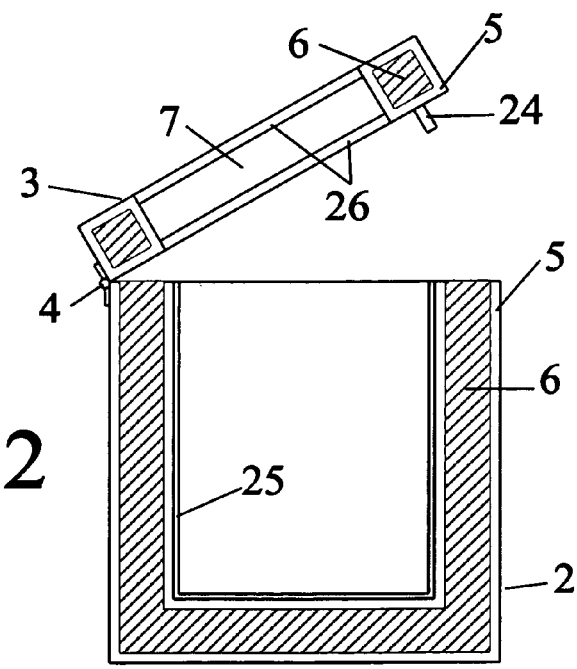
FIG. 2 is a sectional view of the box wall.

Referring to FIG. 1, the Security Masking Box 1 is a box 2 with a cover 3. The cover 3 is preferably connected to the box 2 by a hinge 4. Alternatively, the cover 3 may be a separate piece that fits onto the box 2. As seen in FIG. 2, the box 2 has a double wall 5 construction with sound absorbing materials 6 arranged between the walls 5. The cover 3 uses the same double wall 5 construction with sound absorbing materials 6 as the box 2. The interior surfaces of the box 2 may be covered with a sound absorbing material such as felt 25. The felt 25 will also provide a soft surface to protect the surfaces of devices 8 placed within the box 2.

In one embodiment, as shown in FIG. 1, the cover 3 is provided with a window 7 to allow the cellular or mobile wireless devices 8 to be viewed inside the box for visual observation of any incoming calls and caller identification information. The window 7 has at least two separated layers of transparent material 26 to increase the sound isolating ability of the window 7.

Figure 3:
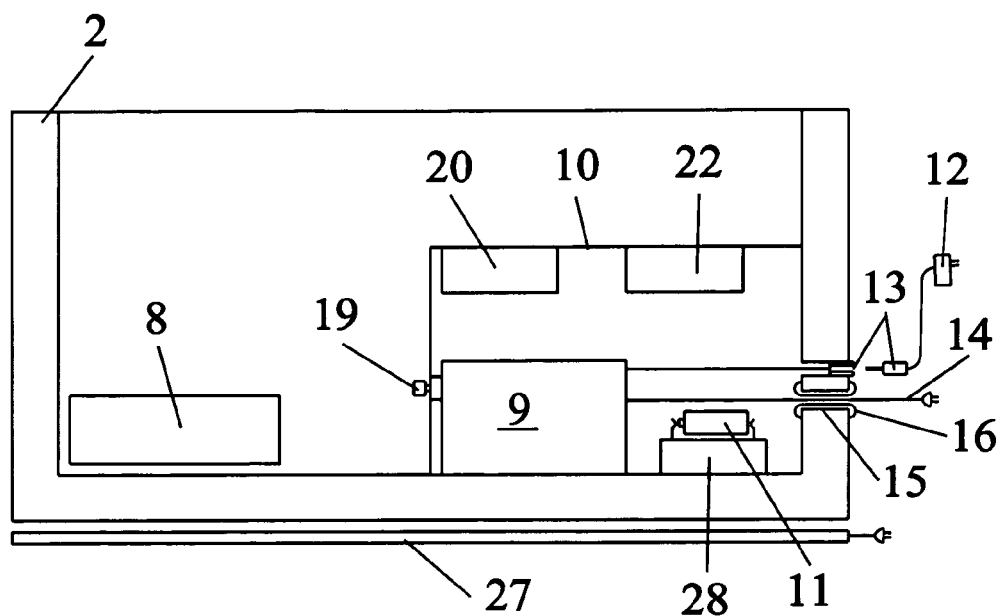
FIG. 3 is an interior view of the present invention.

FIG. 3 shows the interior of the box 2. Acoustical noise masking circuitry 9 is placed beneath an interior shelf 10 in the box 2. The acoustical noise masking circuitry 9 is electrically powered be either one or more batteries 11, or an outside electrical power source 12 such as an A/C adapter. The outside electrical power source 12 may be connected to the box 2 by a plug 13 or it may be permanently attached with the cord 14 routed though an opening 15 in the box. The opening 15 is provided with a grommet 16 or other material to prevent sounds from entering the box 2. The one or more batteries 11 may be rechargeable by an outside electrical power source 12 through the plug 13. Alternatively, the one or more batteries 11 may be recharged by a power mat 27 instead of an outside electrical power source 12. The power mat 27 uses magnetic induction to transfer electricity to receiver circuitry 28 to recharge the one or more batteries 11. This would allow for the manufacture of a box 2 without penetration of the box for a plug 13 thus enhancing appearance and allowing more portability of the Security Masking Box 1 within the room or area without regard to a power outlet. Either during use or afterwards the Security Masking Box 1 could be placed on top of the power mat 27 for recharging of the one or more batteries 11.

The acoustical noise masking circuitry 9 generates various acoustic power levels of pseudo random pink and white noise. The acoustical noise generating circuitry 9 is optimized for voice range noise masking to prevent cellular or mobile wireless devices 8, or other listening devices, from picking up conversations, and is designed to reduce the effectiveness of eavesdropping devices such as microphones and tape recorders. The optimal noise generating circuitry will provide the masking noise in the audio frequency range of 300 Hz to 3 KHz and will generate, if necessary, up to 90 dB of noise at a distance of 4 feet. A control 17 is provided inside the box to adjust the volume of the masking noise. Pink and white noise at the correct levels of intensity have been proven to mask conversations when provided in the same sound range as that of human speech. Inside the box 2, the noise generated is at such a level that any conversations from outside the box 2 are sufficiently masked to render them unintelligible at the microphones of the cellular or mobile wireless devices 8 inside the box 2, or the levels are of such an intensity that some microphones typically used in cellular or mobile wireless devices 8 are driven into saturation with the pink and white noise.

In another embodiment, as shown in FIGS. 1 and 3, the box 2 is provided with an OLED (Organic Light Emitting Diode) caller ID module 20. The caller ID module 20 uses Bluetooth™ or other wireless protocol for exchanging data to connect to the externally mounted OLED indicator 21. Other types of alphanumeric readouts may also be used.

In another embodiment, as shown in FIGS. 1 and 3, one or more RF sensors 22 is mounted inside the box 2 and connected to an outside indicator 23 that visually and/or audibly indicates whether a cellular or mobile wireless device 8 in the box is transmitting an RF signal within the frequency range of the RF sensors 22.

For added security, the box 2 and cover 3 may be provided with a lockable latch 24 to prevent the devices 8 within the box 2 from being surreptitiously removed. The latch 24 may be key or combination operated.

An initial model has been built and tested, and performed as desired when an operating mobile phone was inserted in the box and then called and answered. Conversations in the room were unintelligible and there was not even an indication they were taking place from the phone used to call the phone in the Mobile Phone/PDA Security Masking Box 1.

Although the Mobile Phone/PDA Security Masking Box 1 and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

The invention claimed is:

1. A security masking box for securing and isolating devices capable of detecting sounds in the surrounding environment, comprising:
 (a) a box, comprising:
  (i) an outer box wall;
  (ii) an inner box wall, said outer box wall and said inner box wall defining an acoustic isolation volume between said outer box wall and said inner box wall,
 (b) a sound absorbing material, the acoustic isolation volume between the walls containing said sound absorbing material;
 (c) a box closure configured and dimensioned to close the box, the box closure comprising:
  (i) an outer box closure wall;
  (ii) an inner box closure wall, said outer box closure wall and said inner box closure wall defining a closure acoustic isolation volume between said outer box closure wall and said inner box closure wall,
 (d) a closure sound absorbing material, the closure acoustic isolation volume between the closure walls containing said closure sound absorbing material,
 (e) a window for viewing the interior of the box;
 (f) a support in the interior of the box, the support being arranged to define a portion of the interior of the box;
 (g) acoustical noise masking device supported on said support within the defined portion of the interior of the box; and
 (h) an RF sensor provided inside the box and connected to an indicator to show if a device within the box is transmitting an RF signal;
 whereby when (i) a device which can detect sounds from the surrounding environment is placed within the box, (ii) the box closure is closed and (iii) the acoustical noise masking circuitry is activated, the ability of the device to receive useful sounds from the surrounding environment is substantially compromised.

2. A security masking box as in claim 1 wherein the acoustical masking circuitry is powered by one of at least one battery and an outside electrical source.

3. A security masking box as in claim 1 wherein the box cover closure is connected to the box by a hinge.

4. A security masking box as in claim 1 wherein the window has at least two separated layers of transparent material to increase the sound isolating ability of the window.

5. A security masking box as in claim 1 wherein the interior surfaces of the box are covered with a sound absorbing material.

6. A security masking box as in claim 1 wherein the box and box cover closure are secured in a closed position by a lockable latch.

7. A security masking box as in claim 1 wherein the acoustical noise masking circuitry includes a volume control.

8. A security masking box as in claim 1 wherein the acoustical noise masking circuitry includes an on/off switch.

9. A security masking box as in claim 1 wherein the acoustical noise masking circuitry includes a power on indicator.

10. A security masking box as in claim 1 wherein the box is provided with a caller ID module which uses a wireless protocol for exchanging data to connected to an externally mounted box for securing and isolating devices comprising a microphone for detecting sounds in the surrounding environment, comprising:
 (a) a box, comprising a sound absorbing material;
 (b) a box closure configured and dimensioned to close the box, the box closure comprising a closure sound absorbing material;
 (c) an RF sensor provided inside the box and connected to an indicator to show if a device within the box is transmitting an RF signal; and
 (d) indicator mounted on the exterior of said box to display the originating number of incoming calls to call numbers received by devices within the box, whereby when (i) a device with a microphone for detecting sounds from the surrounding environment is placed within the box, (ii) the box closure is closed and (iii) the acoustical noise generator is activated, the effectiveness of the device to receive useful sounds from the surrounding environment is substantially reduced.

11. A security noise masking box for securing and isolating devices comprising a microphone for detecting sounds in the surrounding environment, comprising:
 (a) a box, comprising a sound absorbing material;
 (b) a box closure configured and dimensioned to close the box, the box closure comprising a closure sound absorbing material;
 (c) an RF sensor provided inside the box and connected to an indicator to show if a device within the box is transmitting an RF signal; and
 (d) an acoustical noise generator positioned within the interior of the box, said acoustical noise generator matching the frequency content of the human voice in substantial part, whereby when
  (i) a device with a microphone for detecting sounds from the surrounding environment is placed within the box, (ii) the box closure is closed, and
(iii) the acoustical noise generator is activated,
the effectiveness of the device to receive useful sounds from the surrounding environment is substantially reduced.

12. A security masking system comprising the security masking box of claim 11, wherein the acoustical noise generator comprises a rechargeable battery and further comprising an inductively coupled power source for recharging said rechargeable battery.

13. A security masking box as in claim 11, wherein the box closure is connected to the box by a hinge.

14. A security masking box as in claim 11, wherein the acoustical noise generator generates pseudo random pink and/or white noise matching in substantial part the human voice range of frequencies.

15. A security masking box as in claim 11, wherein the interior surfaces of the box are covered with a sound absorbing material.

16. A security masking box as in claim 11, wherein the acoustical noise generator generates pseudo random pink and/or white noise matching in substantial part the human voice range of frequencies and is substantially in the range of 300 Hz to 3 KHz and wherein the acoustical noise generator generates up to 90 dB of noise at a distance of 4 feet.

17. A security masking box as in claim 16, wherein the acoustical noise generator generates noise of an intensity that some microphones typically used in cellular or mobile wireless devices are driven into saturation.

18. Security masking system comprising the security masking box of claim 17, wherein the acoustical noise generator comprises a rechargeable battery and further comprising an inductively coupled power source for recharging said rechargeable battery and wherein the acoustical noise generator generates pseudo random pink and/or white noise matching in substantial part the human voice range of frequencies.

19. A security masking box as in claim 18, wherein the acoustical noise generator generates pseudo random pink and/or white noise matching in substantial part the human voice range of frequencies and is substantially in the range of 300 Hz to 3 KHz and wherein the acoustical noise generator generates up to 90 dB of noise at a distance of 4 feet.

20. A security masking box as in claim 19, wherein the interior surfaces of the box are covered with a sound absorbing material.

* * * * *